(12) United States Patent
Heard et al.

(10) Patent No.: US 6,310,157 B1
(45) Date of Patent: Oct. 30, 2001

(54) ANIONIC WATER SOLUBLE POLYMER MADE BY REVERSE PHASE EMULSION POLYMERIZATION

(75) Inventors: Michael Heard; Gordon Chen, both of Suffolk, VA (US); John Oliver Stockwell, West Yorkshire (GB)

(73) Assignee: Ciba Specialty Chemicals Water Treatment Limited, Bradford (GB)

( * ) Notice: Subject to any disclaimer, the term of this patent is extended or adjusted under 35 U.S.C. 154(b) by 0 days.

(21) Appl. No.: 09/314,390

(22) Filed: May 19, 1999

Related U.S. Application Data

(62) Division of application No. 09/001,922, filed on Dec. 31, 1997, now Pat. No. 5,958,188.
(60) Provisional application No. 60/034,247, filed on Dec. 31, 1996.

(51) Int. Cl.[7] .................................................... C08F 20/04
(52) U.S. Cl. ........................................... 526/240; 526/287
(58) Field of Search ..................................... 526/240, 287, 526/307.6, 317.1

(56) References Cited

U.S. PATENT DOCUMENTS

| | | | |
|---|---|---|---|
| 4,471,097 | * 9/1984 | Uhl | 526/240 |
| 4,525,527 | * 6/1985 | Takeda | 524/831 |
| 4,720,346 | * 1/1988 | Flesher | 210/734 |
| 4,925,530 | 5/1990 | Sinclair et al. | 162/164.1 |
| 5,098,520 | 3/1992 | Begala | 162/168.1 |
| 5,167,766 | 12/1992 | Honig et al. | 162/164.1 |
| 5,185,062 | 2/1993 | Begala | 162/168.1 |
| 5,266,164 | 11/1993 | Novak et al. | 162/168.2 |
| 5,274,055 | 12/1993 | Honig et al. | 524/47 |
| 5,393,381 | 2/1995 | Hund et al. | 162/168.3 |
| 5,571,380 | 11/1996 | Fallon | 162/168.2 |
| 5,595,629 | 1/1997 | Begala | 162/158 |
| 6,130,303 | * 10/2000 | Neff | 526/306 |

FOREIGN PATENT DOCUMENTS

| | | |
|---|---|---|
| 0202780 | 11/1986 | (EP) . |
| 0235893 | 9/1987 | (EP) . |
| 0374458 | 6/1990 | (EP) . |
| 0499448 | 8/1992 | (EP) . |
| 95 21295 | 8/1995 | (WO) . |

* cited by examiner

*Primary Examiner*—Christopher Henderson
(74) *Attorney, Agent, or Firm*—David R. Crichton

(57) ABSTRACT

Paper is made by a dual soluble polymer process in which a cellulosic suspension which usually contains alum or cationic coagulant is first flocculated with a high IV cationic synthetic polymer or cationic starch and, after shearing, the suspension is reflocculated by the addition of a branched anionic water soluble polymer having IV above 3 dl/g and tan delta at 0.005 Hz of at least 0.5. The process gives an improved combination of formation, retention and drainage.

10 Claims, 7 Drawing Sheets

Figure 1:
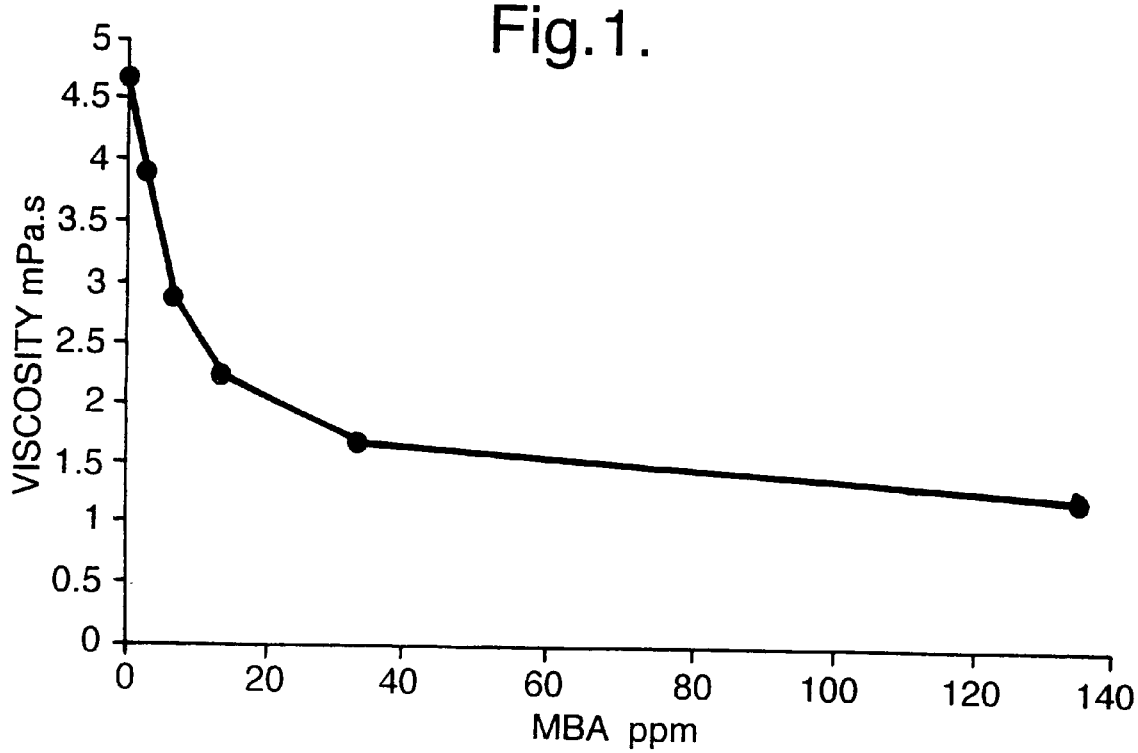

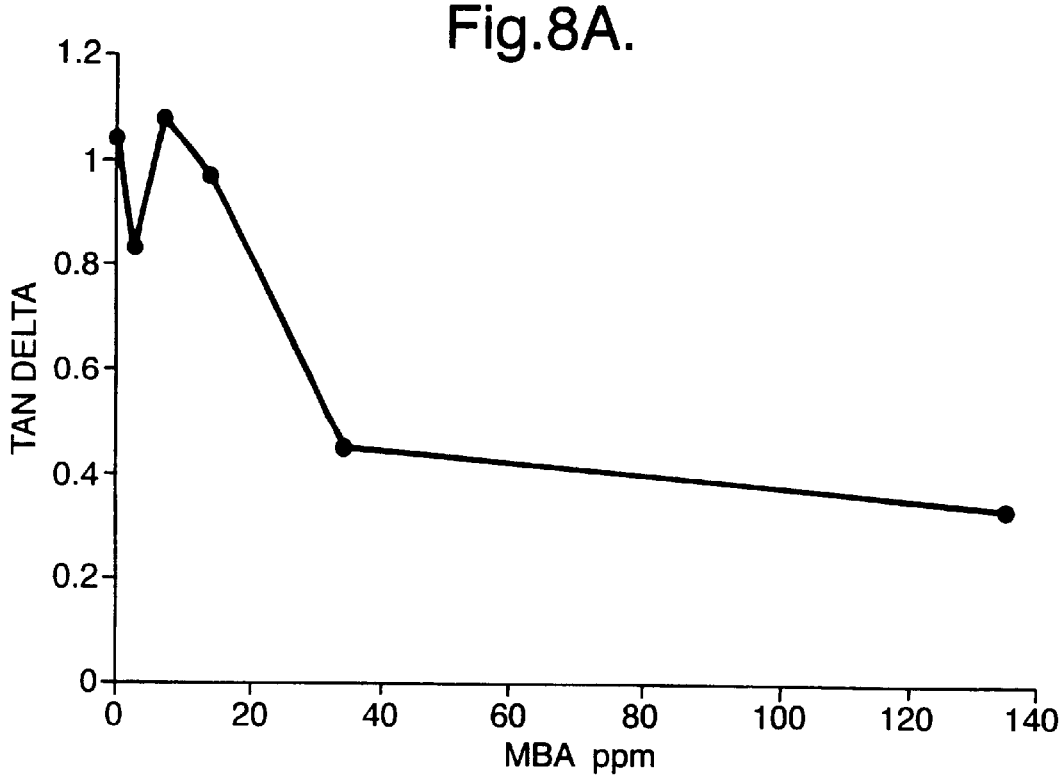
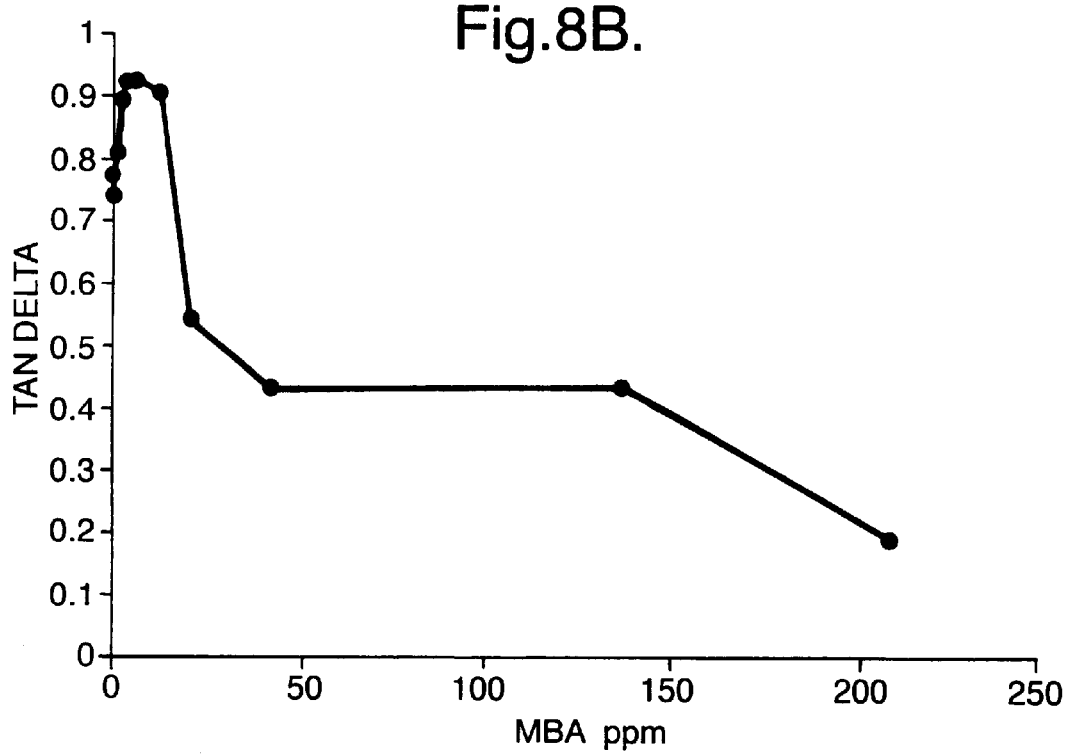

ANIONIC WATER SOLUBLE POLYMER MADE BY REVERSE PHASE EMULSION POLYMERIZATION

This application is a divisional of prior application Ser. No. 09/001,922, filed Dec. 31, 1997 now U.S. Pat. No. 5,958,188.

This application claims the benefit of provisional appl. n60/034,247, filed Dec. 31, 1996

This invention relates to processes for making paper (including paper board), and in particular to such processes in which two polymeric retention aids are used in sequence.

It is standard practice to make paper by a process comprising flocculating a cellulosic suspension by the addition of polymeric retention aid, draining the flocculated suspension through a wire to form a wet sheet, and drying the sheet.

Some polymeric retention aids tend to produce rather coarse flocs in which event retention and drainage may be good but the rate of drying of the wet sheet may be less satisfactory. In particular, the "formation" of the sheet may be rather poor. "Formation" is an indication of the arrangement of fibres within the sheet. A very uniform arrangement is referred to as good formation (but is generally associated with slow drainage) while an uneven distribution of fibres in the sheet is generally regarded as poor formation, but it tends to be associated with rapid drainage.

As a generality, it is known that increasing the molecular weight of a polymeric retention aid which is added immediately prior to drainage will tend to increase the rate of drainage but will tend to damage formation.

Normal practice dictates that polymeric retention aids polymers should be as soluble as possible and so they are usually formed by polymerisation of water soluble monomer or monomer blend in the absence of any cross linking or branching agent.

It is difficult to obtain the optimum balance of retention, drainage, drying and formation by adding a single polymeric retention aid and it is now common practice to add two different materials in sequence.

For a few specialised applications the preferred method is a "soluble dual polymer retention" system in which two water soluble polymers are used in sequence. Generally one has a higher molecular weight than the other In each instance, both polymers are usually as linear and as soluble as is reasonably possible to achieve. Generally the first component is a high charge density, low molecular weight, cationic coagulant such as polyamine or poly DADMAC and the second is a low charge density, high molecular weight, dissolved anionic flocculant.

Different from "soluble dual polymer" retention systems are "microparticulate" retention systems in which a high molecular weight, first, polymeric retention aid (generally cationic) is added to the suspension, the resultant flocs are mechanically degraded by shearing or otherwise agitating the suspension, and the flocculated suspension is then reflocculated by addition of a water-insoluble, microparticulate, material which is usually anionic and counterionic to the polymer. Processes in which the microparticulate material is bentonite are described in EP 235,893 and have been commercialised under the trade name Hydrocol. The polymeric retention aid is usually a fully dissolved linear polymer but it can contain insoluble polymer particles in accordance with EP-A-202,780 or the process and material can be as described in U.S. Pat. No. 5,393,381.

It is also known to use silica and various silica compounds in place of bentonite, and to apply the insoluble microparticulate material after a soluble dual polymer system (low molecular weight cationic followed by high molecular weight anionic).

In EP 235,893 various water-insoluble polymeric emulsions were shown as being unsuccessful replacements for bentonite as the water insoluble microparticulate material. In EP 499,448 bentonite and various water insoluble microparticulate materials were mentioned for aggregating the flocs but it was also mentioned that a water soluble anionic polymer could be used instead of bentonite (thus creating a soluble dual polymer system).

U.S. Pat. Nos. 5,167,766 and 5,274,055 discuss knowm microparticulate systems wherein the insoluble microparticulate material is bentonite or silica sol and propose, two different microparticulate systems in which the microparticulate material is in the form of polymeric microbeads in the cellulosic suspension. Two different systems are described.

In one system the microbeads have a size of less than 60 nm, they are non-cross linked, and they are water insoluble as a result of having been made from water insoluble monomers. For instance the linear, insoluble, beads are exemplified by polystyrene.

In the other system, the microbeads have a size of less than 750 nm (0.75 $\mu$m) and are described as being cross linked microbeads.

It is stated that the retention efficiency of these cross linked microbeads is due to "small strands or tails that protrude from the main crosslinked polymer" (American Cyanamid U.S. Pat. No. 5,274,055 column 4 line 4). It is clear that the cross linked microbeads in U.S. Pat. Nos. 5,167,766 and 5,274,055 are, as is conventional with microparticulate processes, water insoluble material which have sufficient structural integrity that they remain as microbeads despite the protrusion of small strands or tails from the microbeads into the solution. These patents emphasise the importance of the particle size being less than about 750 nm and there is data demonstrating grossly inferior results when the particle size is above 1 $\mu$m. Since the size will be irrelevant if the beads dissolve, this is a further indication that the microbeads must function as particulate, undissolved, materials.

It is stated that the amount of cross linking agent which is used to make the microbeads should be "above about 4 molar ppm" and must be "sufficient to assure a cross linked composition" (American Cyanamid U.S. Pat. No. 5,274,055 column 5 line 22 and column 6 line 59) and is preferably 20 to 4000 ppm.

It is well known that it is possible to obtain by appropriate choice of the polymerisation materials and conditions either a branched water soluble polymer or a cross linked polymer which contains or consists of water insoluble material. For instance water soluble branched polymers are described in American Cyanamid EP-A-374,458. Whether or not a water soluble branched polymer (as in EP-A-374,458) or a water insoluble cross linked polymer (as in U.S. Pat. No. 5,274,055) is obtained depends upon the polymerisation conditions, the materials, and the amounts. American Cyanamid U.S. Pat. No. 5,274,055 discusses both cationic cross linked microbeads and anionic cross linked microbeads. The amount of cross linking agent used in the cationic microbeads is 100 ppm (examples 37 and 38) but the amounts of cross linking agent used for making the anionic microbeads are, in the examples, always more than this, and in particular they are always in the range 349 ppm to 1381 ppm. The only suggestion in U.S. Pat. No. 5,274,055 that lower amounts of cross linking agent might be usable to provide the cross linked microbeads arises from the statement that the microbeads may be made as in U.S. Pat. No. 5,171,808. That again teaches the use of an amount which is sufficient to assure a cross linked composition and which is at least 4 ppm and the examples all show amounts of from 349 ppm to 10000 ppm except for one anionic example with 97 ppm and one cationic example with 100 ppm.

It is stated in U.S. Pat. No. 5,274,055 that the cross linked microbeads preferably have a solution viscosity of 1.1 to 2 mPa.s. This is a saline solution viscosity measured on a 0.1% by weight polymer solution in 1M sodium chloride at 25° C. using a Brookfield UL adaptor at 60 rpm, and the anionic examples have values of 1.06 to 1.37 mPa.s.

It should be noted that, for convenience, we are using the word "solution" to describe the aqueous composition obtained by mixing the polymer with water and allowing the mixture to reach substantial equilibrium even though the "solution" necessarily contains undissolved microbeads. Accordingly we use the word "solution" throughout this specification to indicate a substantially equilibrated aqueous composition irrespective of whether it is a true solution or an aqueous dispersion of undissolved microbeads or larger beads.

We are aware of the commercialisation of materials for a microparticulate paper making process in which the final stage involves the addition of cross linked water insoluble microbeads under the trade name Polyflex CS and which we believe may be intended to be within the scope of U.S. Pat. Nos. 5,167,766 and 5,274,055. Scanning electron microscope examination of equilibrated solutions of Polyflex CS clearly shows the presence of substantially spherical undissolved particles having a size below 750 nm. This provides further confirmation that these two patents are intended to provide a water insoluble, microparticulate, retention system in somewhat similar manner to those provided previously using insoluble bentonite or silica sol. Thus, the cross linking of the particles prevents the particles dissolving into true solution during equilibration with water and instead they retain a visible microparticulate form, which is in the form of solid particles when dried.

These processes, using crosslinked insoluble microbeads, can give adequate retention and formation especially when they are conducted on cellulosic suspensions containing significant amounts of alum. However it would be desirable to obtain improved retention while maintaining adequate formation, compared to these processes. Additionally it would be desirable to obtain an improved combination of retention and formation compared to soluble dual polymer processes.

By the invention, we now provide a soluble, high molecular weight, dual polymer process which achieves these objectives.

A process according to the invention for making paper comprises flocculating a cellulosic suspension by adding a solution of a water soluble, cationic, first, polymeric retention aid to form cellulosic flocs, mechanically degrading the flocs, reflocculating the suspension by adding a solution of an anionic, second water soluble polymeric retention aid made by polymerising a water soluble anionic ethylenically unsaturated monomer charge under polymerisation conditions, forming a sheet by draining the reflocculated suspension and drying the sheet, and we use as the anionic polymeric retention aid a water soluble polymer which (a) is a branched polymer made using branching agent in the monomer charge and (b) has intrinsic viscosity above about 3 dl/g and (c) has a tan delta rheological oscillation value at 0.005 Hz of at least 0.5, or has a deionised SLV viscosity number which is at least three times the salted SLV viscosity number of the polymer made under the same conditions from the same monomer charge but in the absence of branching agent.

The polymer is made by reacting the monomer or monomer blend under polymerisation conditions in conventional manner except that branching agent is included in the monomer charge. The amount of branching agent and the polymerisation conditions under which the monomer charge is reacted to form the polymer are selected in such a manner that the polymer is a water soluble branched polymer and is not a water insoluble cross linked polymer. In particular, if the polymer is made by reverse phase emulsion polymerisation and is cross linked (and thus includes water insoluble particles) instead of being branched and wholly water soluble (as in the invention), the polymer will behave as a particulate or microbead polymer in the aqueous cellulosic suspension instead of behaving as a true solution polymer.

One way of indicating that the branched polymer is behaving as a solution polymer rather than a microparticulate polymer is by reference to the tan delta value, as explained in more detail below. Low values under the specified conditions indicate that the polymer is particulate rather than truly dissolved. Accordingly one way of indicating that the branched polymer is in solution, as in the invention, rather than being in the form of cross linked particles is by observing that the defined tan delta value is relatively high (above 0.5 and preferably above 0.7).

Another way of indicating that the polymer is in true solution rather than being microparticulate is by observing that the deionised SLV viscosity number for the branched polymer is at least three times the salted SLV viscosity number of a polymer made by reacting the same monomer charge (but in the absence of branching agent) under the same polymerisation conditions. We refer to this below as the "corresponding unbranched polymer".

By referring to the "same monomer charge" and the "same polymerisation conditions" we mean that the charge and the conditions are as constant as is reasonably achievable in commercial production (except for deliberate variations in the amount of branching agent and, if appropriate, chain transfer agent).

As a result of using a water soluble branched anionic polymer in the final stage, instead of using an anionic cross linked particulate polymer of U.S. Pat. No. 5,274,055, the invention gives improved retention and drainage while maintaining satisfactory formation. As a result of using a water soluble branched polymer instead of a conventional high molecular weight substantially linear anionic polymer the invention provides improved formation and additionally can give an improvement in retention and drainage. Thus, the invention provides an improved combination of formation, retention and drainage compared to a dual polymer process in which the final stage is a conventional linear anionic polymer and compared to a microparticulate process in which the final stage is provided by a cross linked anionic microbead as in U.S. Pat. No. 5,274,055.

In particular, it is possible to obtain retention and drainage values which are as good as or better than the values obtainable using the corresponding unbranched polymer but it is possible to obtain a significant improvement in formation properties, relative to those obtainable when using the corresponding unbranched polymer.

It is important in the invention to include branching agent in the monomer charge for the second polymer but it is also important that the amount of branching agent is kept to very low values. If the amount is less than about 0.5 to 1 ppm then the desired improved formation will not be achieved but if the amount is too high then the desired improvement in dewatering and retention values will not be achieved. For instance, if the amount is too high then the anionic polymer will behave as an insoluble cross linked microparticulate polymer instead of behaving as a soluble branched polymer which gives improved dewatering and retention.

If the amount of branching agent is too low (for any particular combination of monomer blend, polymerisation conditions and branching agent) then the desired improvement in formation will not be obtained compared to the formation obtainable with the corresponding polymer made in the absence of the branching agent, and therefore having higher IV. If the amount of branching agent is too high then the drainage and retention values will be inferior.

The precise amount that is used in the production of the anionic polymeric retention aid depends on the particular branching agent which is being used and on the polymerisation conditions which are being used. In particular, as mentioned below, it is possible to add chain transfer agent in which event the amount of branching agent which is used may be higher than the amount which would be used in the absence of chain transfer agent.

The branching agent can be a branching agent that causes branching by reaction through carboxylic or other pendant groups (for instance an epoxide, silane, polyvalent metal or formaldehyde) but preferably the branching agent is a polyethylenically unsaturated monomer which is included in the monomer blend from which the polymer is formed. The cross linking agent can be a difunctional material such as methylene bis acrylamide or it can be a trifunctional, tetrafunctional or higher functional branching agent, for instance tetra allyl ammonium chloride. Preferably it is water soluble.

The amount of polyethylenic branching agent is generally below 10 ppm and most preferably below 5 ppm. Best results may be obtained with around 0.5 to 3 or 3.5 ppm or 3.8 ppm but in some instances amounts above 4.1 or 4.2 ppm up to 7 or even 10 ppm or higher are appropriate. Thus sometimes amounts up to 20 ppm are useful, or even up to 30 or 40 ppm (generally in the presence of chain transfer agent) but lower amounts are usually needed in order to comply with the tan delta limits. Unless otherwise stated, throughout this specification the amount of branching agent is quoted as moles branching agent per million moles monomer (i.e., ppm molar).

The branched polymer of the invention may be made under polymerisation conditions wherein it is intended that there should be no deliberate chain transfer agent present during the reaction. The amounts of branching agent quoted above (for instance 1 to 10 ppm and preferably 1 to 3.8 ppm) are particularly suitable when no chain transfer agent is added. However it can be desirable to add some chain transfer agent in which event it is possible to increase the amount of branching agent up to 20 or 30 ppm or 40 ppm, and while still maintaining the characteristic properties and performance of the polymer. The amount of chain transfer agent which is selected will depend upon the particular material which is being used and upon the amount of branching agent, the monomer charge, and the polymerisation conditions.

Although quite large amounts of branching agent can be used, preferably the amount is quite low since it seems that best results are obtained with the use of low amounts of chain transfer agent. A preferred chain transfer agent is sodium hypophosphite. Although large amounts can be used best results generally require amounts for this of below 50 ppm and preferably below 20 ppm (by weight based on the weight of monomer). Best results are generally obtained with not more than 10 ppm. However if the amount is too low, for instance below about 2 ppm, there may be inadequate benefit from using a chain transfer agent.

Any of the chain transfer agents which are suitable for use as chain transfer agents in the aqueous polymerisation of water soluble acrylic monomers (such as isopropanol or mercapto compounds) can be used in the invention as an alternative to the preferred material, hypophosphite. If a material other than hypophosphite is being used, it should be used in an amount selected so that it gives substantially the same chain transfer effect as the quoted amounts for hypophosphite.

Although it is preferred to use low amounts of chain transfer agent, it is also possible to use larger amounts, for instance 100 ppm or more, generally with less effective results, provided that the combination of materials and polymerisation conditions is such that the polymer has the specified physical properties.

One of these is the intrinsic viscosity of the polymer. This is measured using a suspended level viscometer in 1M NaCl buffered to pH 7.5 at 25° C. It is usually at least 3 or 4 dl/g, and preferably at least 6 dl/g. It can be as high as, for instance, 18 dl/g but is usually below 12 dl/g and often below 10 dl/g.

The preferred polymer can also be characterised by reference to the corresponding polymer made under the same polymerisation conditions but in the absence of branching agent (i.e., the "corresponding unbranched polymer"). The unbranched polymer generally has an intrinsic viscosity of at least 6 dl/g and preferably at least 8 dl/g. Often it is 16 to 30 dl/g. The amount of branching agent is usually such that the intrinsic viscosity is reduced by at least 10% and usually at least 25% or 40%, up to 70%, or sometimes up to 90%, of the original value (expressed in dl/g) for the unbranched polymer referred to above.

Instead of or in addition to relying on intrinsic viscosity, the polymer can also be characterised by its saline Brookfield viscosity.

The saline Brookfield viscosity of the polymer is measured by preparing a 0.1% by weight aqueous solution of active polymer in a 1M NaCl aqueous solution at 25° C. using a Brookfield viscometer fitted with a UL adaptor at 60 rpm. Thus, powdered polymer is added to the 1M NaCl aqueous solution or a reverse phase emulsion polymer is added to that solution. The saline solution viscosity is generally above 2.0 mPa.s and is usually at least 2.2 and preferably at least 2.5 mPa.s. Generally it is not more than 5 mPa.s and values of 3 to 4 are usually preferred. These are all measured at 60 rpm.

The tan delta value at 0.005 Hz is obtained using a Controlled Stress Rheometer in the Oscillation mode on a 1.5% by weight aqueous solution of polymer in deionised water after tumbling for two hours. In the course of this work a Carrimed CSR 100 is used fitted with a 6 cm acrylic cone, with a 1°58' cone angle and a 58 $\mu$m truncation value (Item ref TA 5664). A sample volume of approximately 2–3 cc is used. Temperature is controlled at 20.0° C.±0.1° C. using the Peltier Plate. An angular displacement of $5 \times 10^{-4}$ radians is employed over a frequency sweep from 0.005 Hz to 1 Hz in 12 stages on a logarithmic basis. G' and G" measurements are recorded and used to calculate tan delta (G"/G') values.

The value of tan delta is the ratio of the loss (viscous) modulus G" to the storage (elastic) modulus G' within the system.

At low frequencies (0.005 Hz) we believe that the rate of deformation of the sample is sufficiently slow to enable linear or branched entangled chains to disentangle. Network or crosslinked systems have permanent entanglement of the chains and show low values of tan delta across a wide range of frequencies. Consequently we use low frequency (e.g., 0.005 Hz) measurements to characterise the polymer properties in an aqueous environment.

The branched polymers preferably have a tan delta value at 0.005 Hz of above 0.7. They preferably have a value which is reasonably close to the value of the corresponding unbranched polymers, that is to say the polymers made under the same conditions but in the absence of branching agent, and therefore having higher IV. For instance they preferably have tan delta which is at least 50% and often at least 80%, for instance up to 120% or more of tan delta for the corresponding unbranched polymers. However we find that when the amount of branching agent is increased significantly tan delta at 0.005 Hz drops to below 0.5 and this is undesirable. The preferred tan delta values at 0.005 Hz for the polymers used in the invention are above 0.8 and preferably above 0.9, e.g., up to 1.1 or 1.3 or higher.

Instead of or in addition to relying on the tan delta values to characterise the freedom of the polymers from the presence of insoluble cross linked microparticles, it is also possible to rely on the ratio between deionised and salted SLV viscosity numbers.

The SLV viscosity numbers in the invention are determined by use of a glass suspended level viscometer at 25° C., the viscometer being chosen to be appropriate according to the viscosity of the solution. The viscosity number is $\eta-\eta_0/\eta_0$ where $\eta$ and $\eta_0$ are the viscosity results for aqueous polymer solutions and solvent blank respectively. This can also be referred to as specific viscosity. The deionised SLV viscosity number is the number obtained for a 0.05% aqueous solution of the polymer prepared in deionised water. The salted SLV viscosity number is the number obtained for a 0.05% polymer aqueous solution prepared in 1M sodium chloride.

The deionised SLV viscosity number is preferably at least 3 and generally at least 4, for instance up to 7, 8 or higher. Best results are obtained when it is above 5. Preferably it is higher than the deionised SLV viscosity number for the unbranched polymer, that is to say the polymer made under the same polymerisation conditions but in the absence of the branching agent (and therefore having higher IV). If the deionised SLV viscosity number is not higher than the deionised SLV viscosity number of the unbranched polymer, preferably it is at least 50% and usually at least 75% of the deionised SLV viscosity number of the unbranched polymer. The salted SLV viscosity number is usually below 1. The deionised SLV viscosity number is often at least five times, and preferably at least eight times, the salted SLV viscosity number.

The polymers of the invention can be made by any of the conventional suitable polymerisation processes which are known for making water soluble acrylic and other addition polymers such as bead or gel polymerisations. The preferred type of polymerisation process is reverse phase emulsion polymerisation so as to form a reverse phase emulsion of water soluble polymer particles in non-aqueous liquid. This product typically has an initial particle size at least 95% by weight below 10 µm and preferably at least 90% by weight below 2 µm, for instance down to 0.1 or 0.5 µm. It can therefore be a conventional reverse phase emulsion or microemulsion and can be made by any of the known techniques for making such materials. Although it is proposed in U.S. Pat. No. 5,171,808 that it is important that the particle size of its microbeads should be, number average, below 0.75 µm, in the invention satisfactory results are obtained with particles above 1 µm. Presumably this is because substantially all the particles of the emulsion (i.e., substantially everything other than impurities) goes into true solution before use. If desired the number average size can be typical of a microemulsion, for instance down to 0.05 or 0.1 µm.

The emulsion can be supplied in the form in which it is made (as an emulsion of aqueous polymer droplets in oil or other water immiscible liquid) or if desired it can be substantially dehydrated to form a stable dispersion of substantially anhydrous polymer droplets dispersed in oil. Conventional surfactant and optional polymeric amphipathic stabiliser may be included in known manner to stabilise the emulsion.

The reverse phase or other polymerisation process is conducted on a charge of the desired monomer or monomer blend. The monomer or monomer blend which serves as the charge for the polymerisation is usually an aqueous solution.

It is generally preferred for the anionic branched polymer to be a copolymer of 5 to 97% by weight acrylamide or other water soluble, non-ionic, ethylenically unsaturated monomer and 95 to 3% by weight ethylenically unsaturated carboxylic or sulphonic or other anionic monomer. Any of the conventional water soluble carboxylic and sulphonic monomers may be used such as acrylic acid, methacrylic acid, crotonic acid, vinyl sulphonate and AMPS. The preferred anionic monomer is often acrylic acid, often introduced as sodium acrylate or other water soluble salt. Preferred copolymers contain from 20 to 80%, often 40 to 75% by weight acrylic acid (often as sodium acrylate) with the balance being acrylamide.

A blend of anionic polymers can be used. The blend must comply with the definitions we give for the properties of the second polymer, and preferably each component of the blend complies with the definition.

Initiator is added to the charge in an amount and under conditions, and the charge is maintained at a temperature, such that the corresponding unbranched polymer would have whatever IV is appropriate having regard to the properties which are required and the amount of branching agent and possibly chain transfer agent.

Activating surfactant may be added to the polymer emulsion in order to promote the equilibration or activation of the emulsion into water.

The emulsion or other form of the polymer is usually put into the form of a true aqueous solution, typically of 0.05 to 2% polymer concentration, before the polymer is added to the cellulosic suspension.

The cellulosic suspension can be formed from any suitable cellulosic stock. The cationic and anionic retention aids are usually both added to the cellulosic suspension at a time when it is a thin stock, typically having a cellulose content of 0.1 to 1.5, often 0.2 to 1% dry weight. It may be wholly or substantially unfilled or it may be lightly or heavily filled, and thus may contain from, for instance, 3 to 50%, often 10 to 30%, filler based on the dry weight of the suspension. The resultant paper can be filled or unfilled and can be any grade of paper or paper board.

It is preferred that the suspension contains a dissolved aluminium compound such as alum, aluminium sulphate, polyaluminium chloride, or any of the other aluminium compounds which can traditionally be incorporated into paper-making suspensions as inorganic coagulant. The amount of aluminium compound is usually at least 100 g/t and generally above 1 kg/t. It can be up to, for instance, 10 or even 50 kg/t.

It is also possible to use low molecular weight (IV below 2 or 3 dl/g) cationic coagulant polymers, such as polyamine or poly DADMAC or polyethylene imine, instead of or in addition to the alum. The inorganic or polymeric coagulant is normally included in the thin stock before the addition of the first polymeric retention aid but can be added with or after the first polymeric retention aid. Polyamine is preferred.

The cationic, first, retention aid which is used before the anionic polymer can be a cationic starch or other natural cationic polymer, but is preferably synthetic. It should have a high molecular weight, for instance as is conventional for cationic retention aids. Generally it is a copolymer of acrylamide or other nonionic ethylenically unsaturated water soluble monomer with a monoethylenically unsaturated cationic monomer. This can be a material such as diallyl dimethyl ammonium chloride but is more usually a dialkylaminoalkyl (meth)-acrylamide or -acrylate. Generally the first retention aid is a copolymer of 30 to 90% by weight acrylamide and 10 to 70% by weight dimethylaminoethyl acrylate or methacrylate (usually as acid addition or quaternary ammonium salt). It usually has an intrinsic viscosity of at least 4 dl/g, for instance at least 6 dl/g and usually at least 8 dl/g, for instance up to 15 or 20 dl/g.

The cationic polymer is usually linear and wholly water soluble. However it may be made as a cross linked reverse phase emulsion polymer as described in EP 202,780 or any other suitable high IV cationic retention aid.

The addition of the first, cationic, retention aid causes flocculation of the suspension. The flocs are subjected to mechanical degradation as a result of turbulence along a duct or, more usually passage through the fan pump or a centriscreen or both. The amount of degradation is usually the amount required to break the flocs down to microflocs which are reasonably stable against further mechanical degradation.

After sufficient degradation of the flocs has occurred, the second component of the soluble dual polymer system, namely the solution of anionic, branched, second polymeric retention aid, is added to the suspension. The suspension can be subjected to further deliberate shear but generally little or no shear is applied to the suspension after adding the second retention aid. For instance the anionic retention aid may be added in the headbox or just prior to the headbox.

The optimum amount of cationic and anionic retention aids will be selected having regard, inter alia, to the amount and type of all the other components in the suspension but each is usually in the range 50 to 2000 g/t (grams polymer per tonne dry weight suspension). For instance the amount of first polymer is typically 100 or 200 to 1500, often around 300 to 1000, g/t and the amount of second polymer is often 50 to 2000, often around 100 to 1000, g/t. Each polymer is usually dissolved in water to obtain a homogeneous stable composition prior to use.

We find that the use of the soluble dual polymer retention system of the invention using the defined polymers gives a very valuable combination of retention, drainage and formation performance. In particular, we find that retention and drainage performance increases as the amount of branching agent is increased from zero up to a low value at which the retention and drainage peaks, with further increase in the amount of branching agent then tending to result in reduced retention and drainage performance. This peak may occur at around 2 to 3.5 ppm branching agent (of a polyethylenically unsaturated branching agent) but in some instances it may occur at higher values such as up to 7 or even 10 ppm, often in the absence of chain transfer agent but sometimes a little higher in the presence of chain transfer agent.

We find that the general trend of retention performance follows very closely the general trend of deionised SLV or Brookfield viscosity and tan delta at 0.005 Hz. In particular, we find that when the amount of branching agent is increased to values at which the deionised SLV viscosity and the tan delta value have fallen considerably from their peak down to a value similar to that which is obtained at, for instance, 100 or 200 ppm branching agent (in the absence of chain transfer agent), inferior results are obtained.

It is clear that in the invention the superior retention and drainage properties are obtained as a result of the polymer molecules having a branched state, in contrast to being in an insoluble network or insoluble microbead state, as in U.S. Pat. Nos. 5,167,766 or 5,171,808. Thus it seems that in the invention the individual branched molecules are sufficiently linear that they can move independently of each other in broadly the same way as individual linear molecules can move independent of each other.

As explained above, when considering a conventional linear polymeric retention aid, increased retention performance may be expected with increased IV and increased deionised solution viscosity, but this increase in retention is generally accompanied by a deterioration in formation. In the invention we surprisingly find that the increase in retention and deionised solution viscosity is accompanied by a significant improvement in formation (at constant polymer dose).

This is the first instance of which we are aware where branching of the polymer is accompanied by an improvement in papermaking tests both in retention and in formation, at constant polymer dosage. Further, the retention is considerably better, and the formation is not significantly worse, than is obtained when the polymer is further modified by the incorporation of much larger amounts of branching agent so as to obtain a cross linked, insoluble, microbead structure, for instance as described in U.S. Pat. No. 5,171,808.

Since the process gives improved retention, it is possible to reduce the amount of polymer while maintaining adequate retention, and this reduction in the polymer dosage can lead to further improvement in formation.

The following are examples.

EXAMPLE 1

An unbranched copolymer is formed by reverse phase emulsion polymerisation in conventional manner from 40% by weight sodium acrylate and 60% by weight acrylamide. The resultant emulsion is subjected to azeotropic distillation to form a stable dispersion of substantially anhydrous polymer droplets, having a size mainly below 2 $\mu$m, dispersed in oil.

The process is repeated a number of times with different amounts of methylene bis acrylamide included in the mixture of sodium acrylate and acrylamide.

Figure 2:
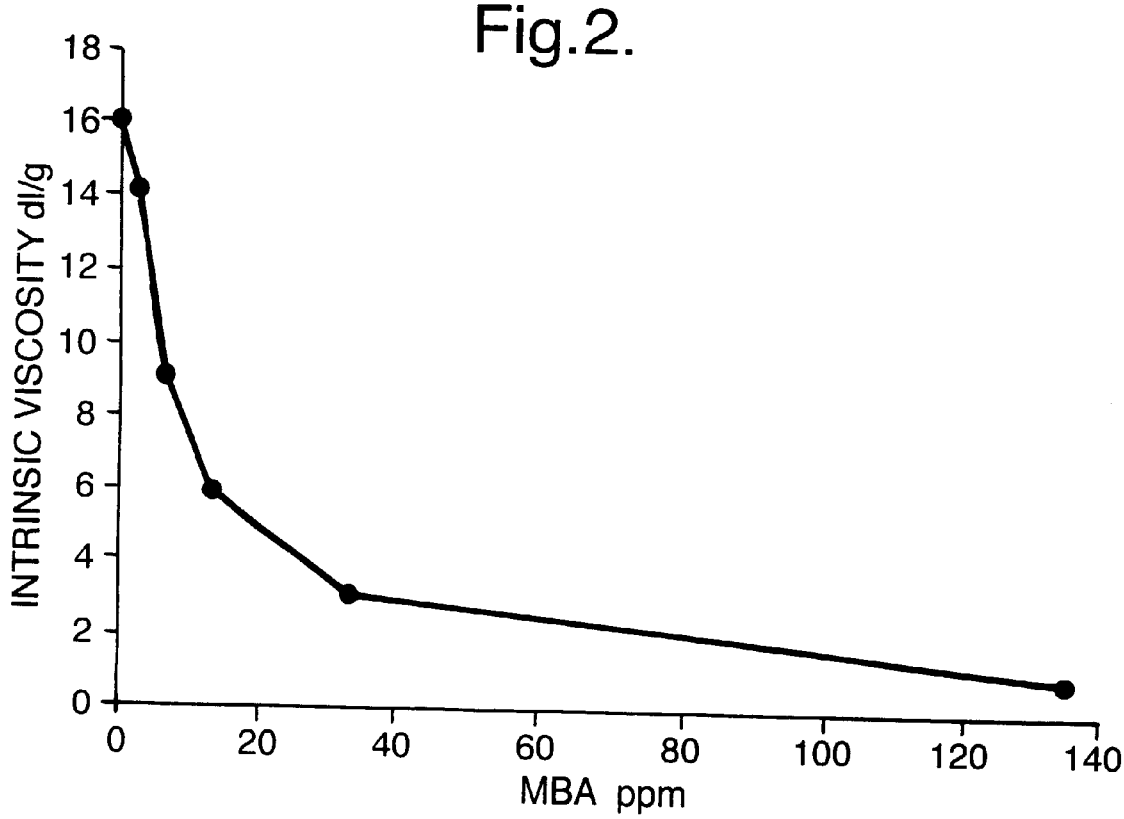
Figure 3:
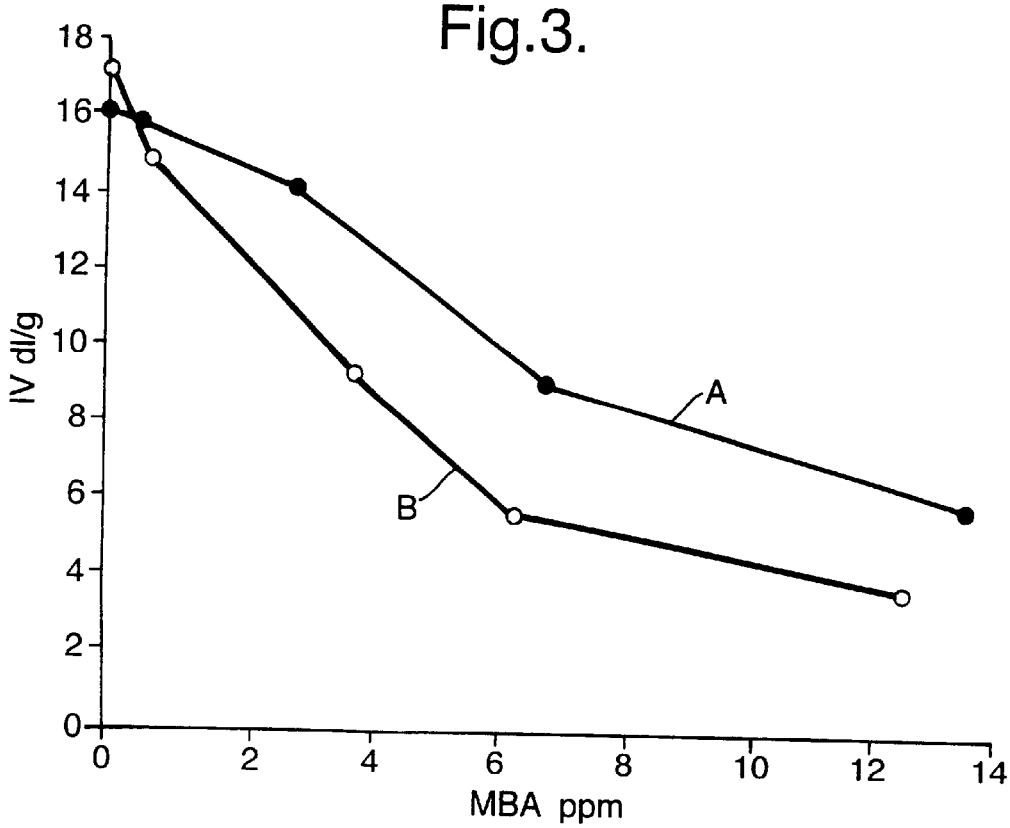
Figure 4:
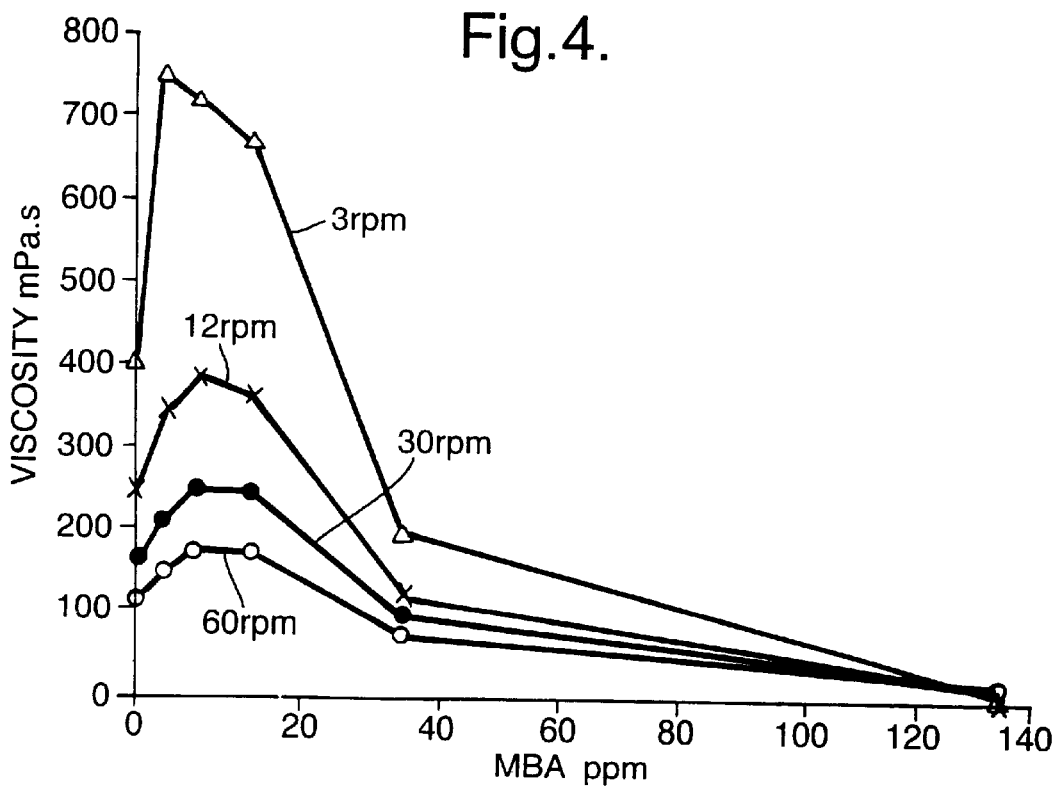
Figure 5A:
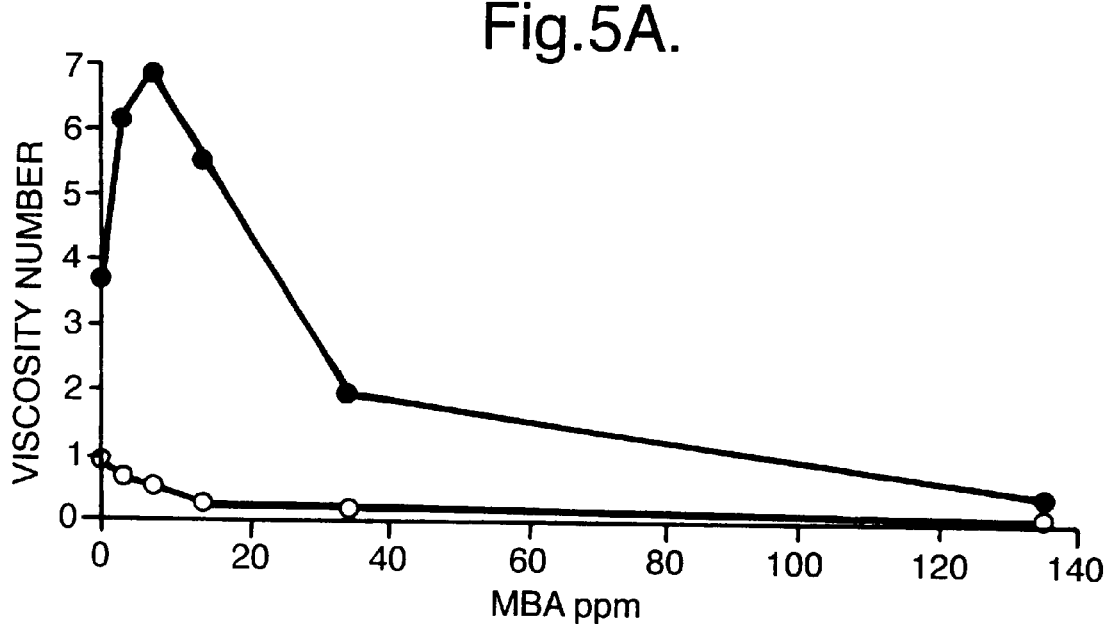
Figure 5B:
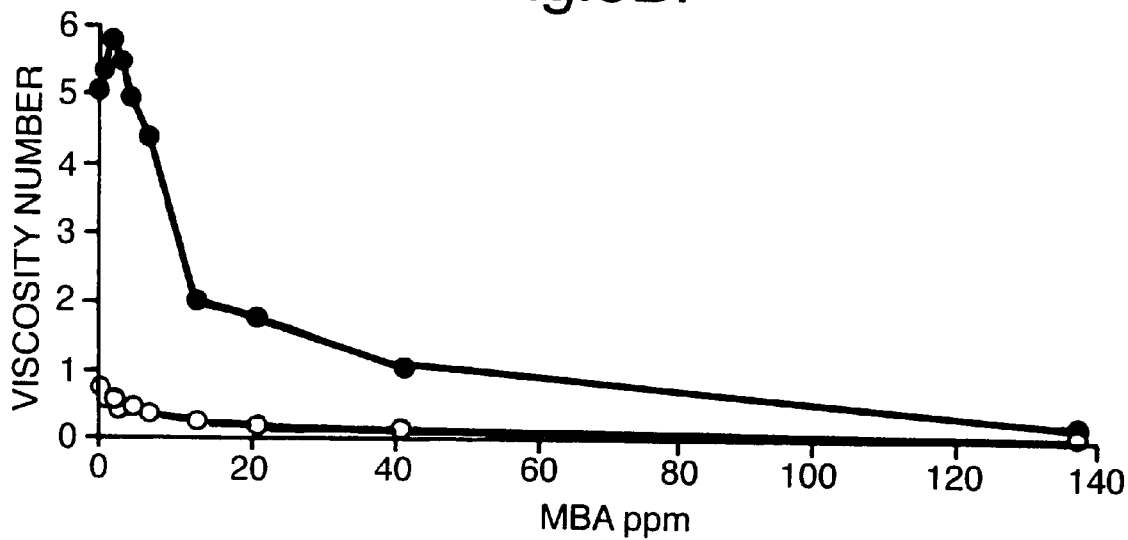
Figure 6:
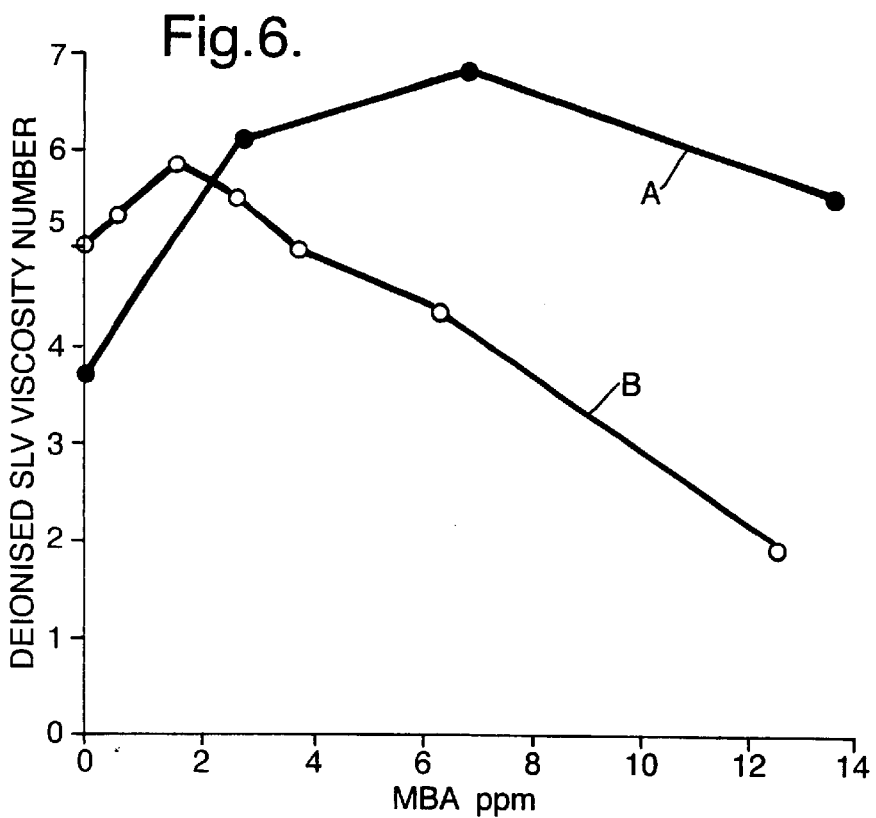
Figure 7:
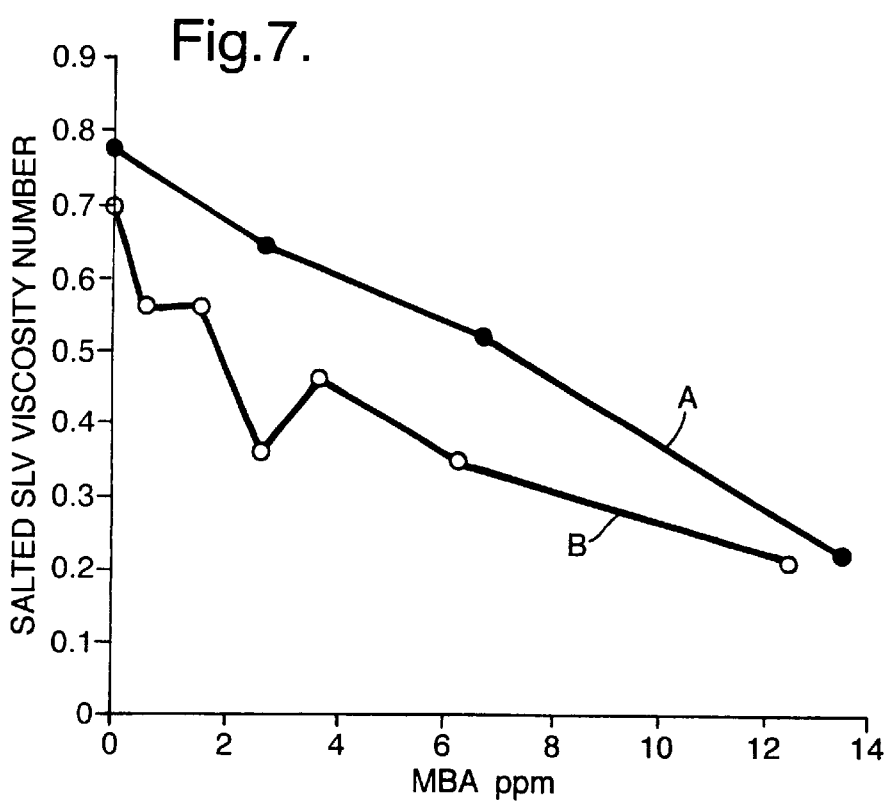
Figure 8C:
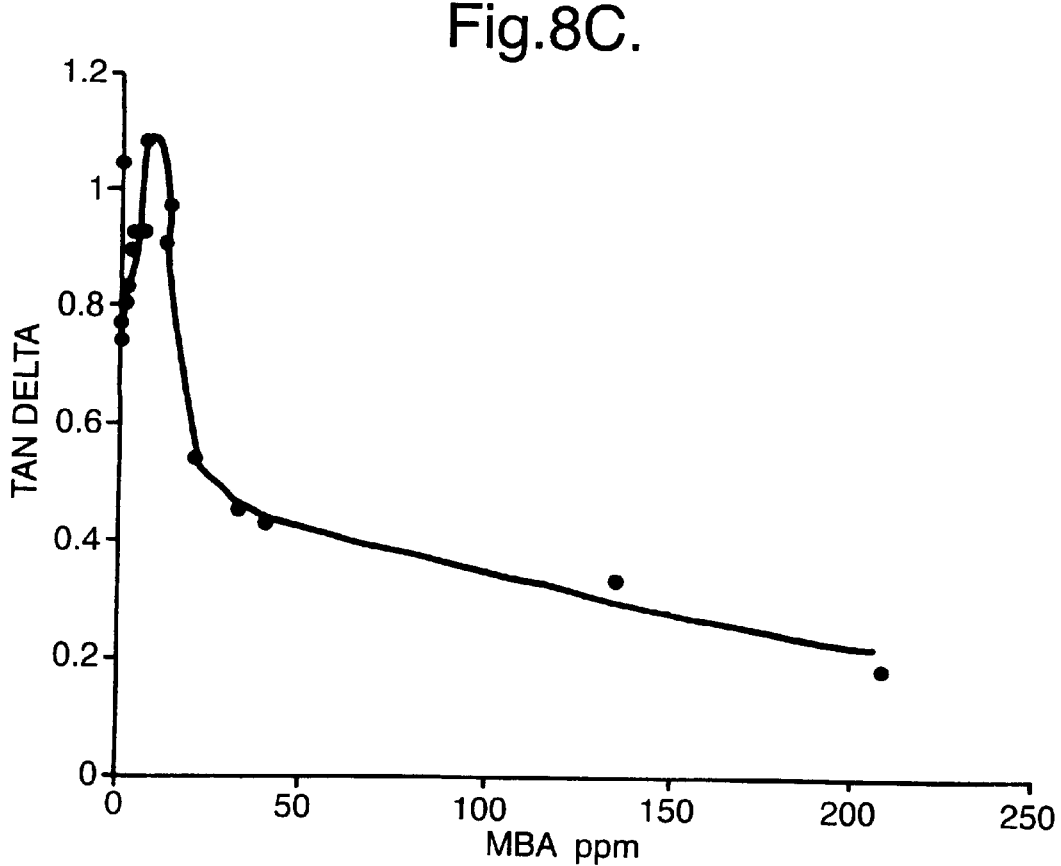
Figure 9:
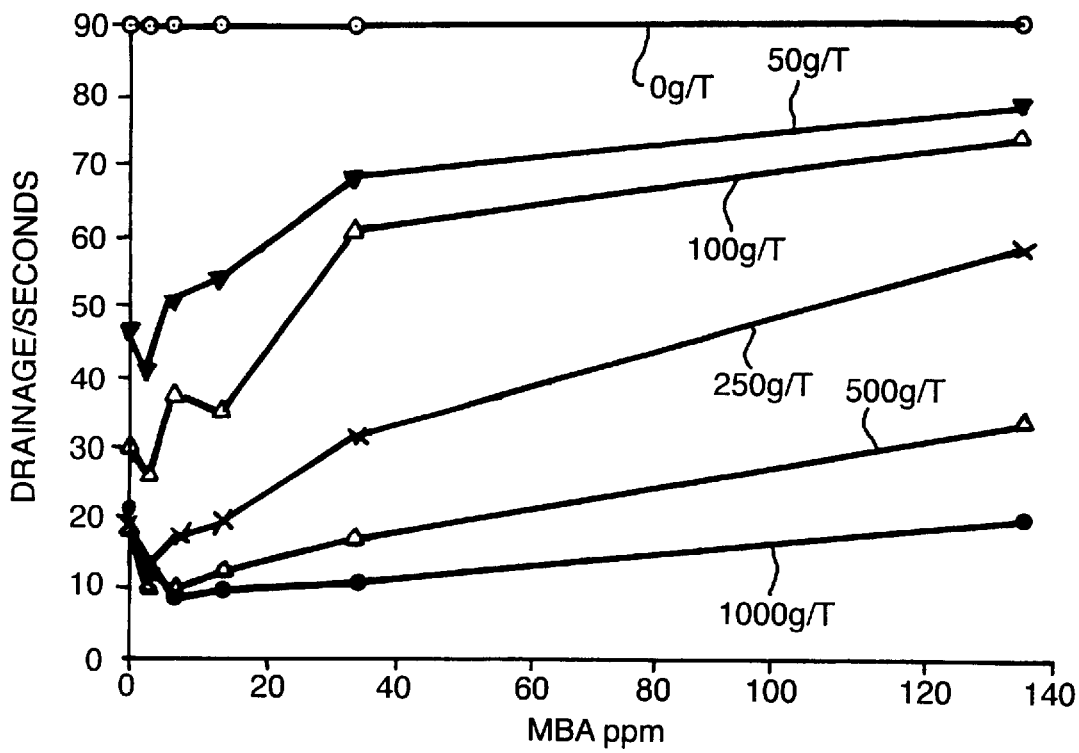
Figure 10:
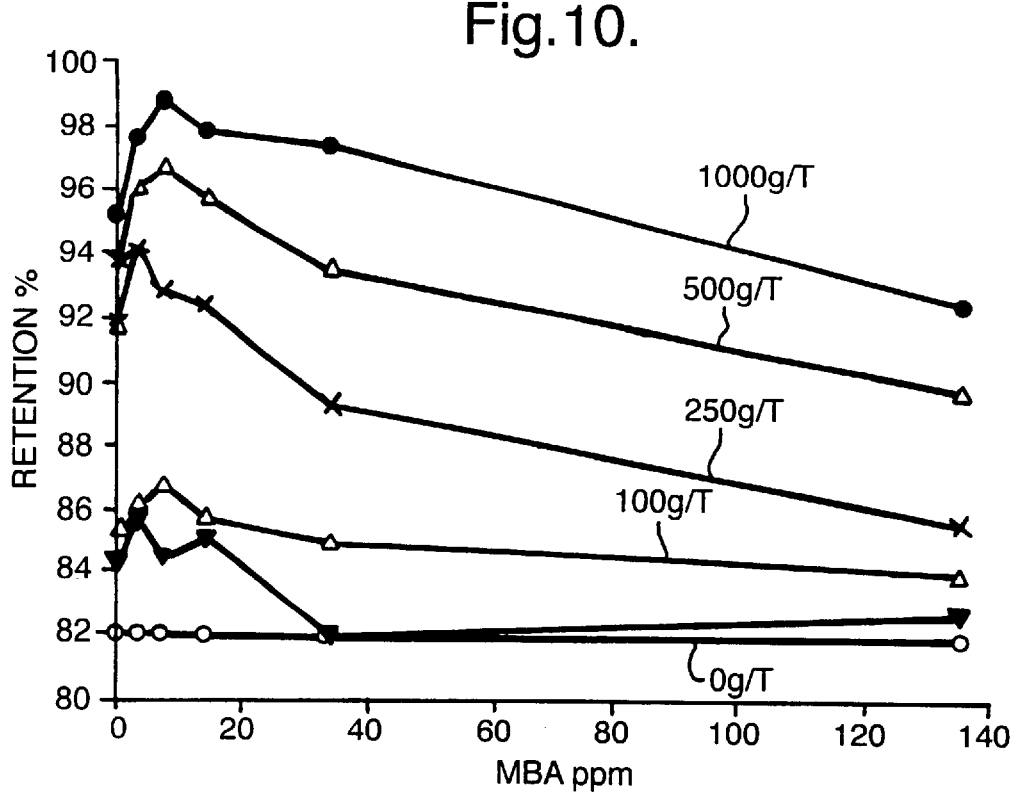

The polymers made by this experiment are labelled series A. At a separate location using different monomers, polymers were made from the same weight amounts of sodium acrylate and acrylamide and a range of methylene bis acrylamide branching agent amounts, and these were labelled series B. The various deionised and saline viscosities and intrinsic viscosities and tan delta values for these polymers were recorded in accordance with the protocols given above. Results are shown graphically in the accompanying drawings in which FIG. 1 is a plot of the viscosity of 0.1% polymer solution in 1M NaCl measured by Brookfield LVT with UL adaptor, at different amounts of methylene bis acrylamide (MBA) branching agent FIG. 2 is a plot of the intrinsic viscosity over the range 0 to 135 ppm molar FIG. 3 is a plot of the intrinsic viscosity over the range 0 to 14 ppm MBA for series A polymers and series B polymers FIG. 4 is a plot of the viscosity of 0.1% solution in deionised water measured with a Brookfield LVT spindle 2 at differing rotation speeds of 3, 12, 30 and 60 rpm FIG. 5a is a plot of the deionised SLV viscosity number (upper line) and the salted SLV viscosity number (lower line) for series A polymers over the range 0 to 135 ppm MBA and FIG. 5b shows the corresponding plot for series B polymers FIG. 6 shows the plot for the series A and series B polymers of the deionised SLV viscosity number at different MBA amounts FIG. 7 shows the corresponding plot for the salted SLV viscosity number FIG. 8a is a plot of the tan delta value for the series A polymers FIG. 8b is a plot of the tan delta value for the series B polymers FIG. 8c is a combined plot of the tan delta values for all the polymers FIG. 9 is a plot of the Schopper Riegler drainage values at different dosages ranging from 0 to 1000 g/ton of polymers made by with differing amounts of MBA FIG. 10 is a corresponding plot of the Britt jar retention values.

It will be observed from each of FIGS. 1 to 8c that there is a consistent trend of properties changing rapidly as the amount of branching agent increases up to around 10 or 20 ppm and then changing much more slowly and indeed tending to plateau out from around 20 or 30 ppm upwards. Also, there is a consistent trend that many of the properties have a peak value at a very low amount of branching agent, below 10 ppm. It is reasonable to deduce from all these plots that the physical state of the polymers changes rapidly as the amount of branching is increased up to around 10 or 20 ppm but that by the time the amount of branching agent has exceeded, for instance, about 40 or 50 ppm further change is relatively slow. This would be consistent with the polymer being present in the form of insoluble cross linked microparticles at the higher amount of branching agent but the polymer being substantially free of insoluble particles at the lower amount of branching agent.

EXAMPLE 2

The retention and dewatering properties obtained when using the resultant branched polymers are determined by standard Britt jar and Schopper-Riegler methods respectively on a 50/50 bleached pine/bleached birch suspension containing 25% (on total solids) precipitated calcium carbonate and 8 kg/t alum 1 kg/t of cationic retention aid formed from 90% acrylamide and 10 mole % dimethylaminoethyl acrylate quaternary salt, IV 12 is used. In each instance various dosages of the second polymer are added.

The results are shown in FIG. 9 (drainage) and FIG. 10 (retention). It is immediately apparent that there is a close correlation between the amount of branching agent which gives minimum drainage time (and therefore best drainage) and maximum (and therefore best) retention value, on the one hand and the amount of branching agent which gives peak deionised solution viscosity and peak Tan delta at 0.005 Hz on the other. The fact that polymers at or close to the peak deionised solution viscosity values and 0.005 Hz Tan delta values give better drainage and retention values than polymers cross linked with, for instance, more than 100 ppm molar MBA is clearly apparent from, for instance, FIGS. 9 and 10.

EXAMPLE 3

A plant trial is conducted on a conventional papermaking machine. The cellulosic suspension consists of 60% hard wood and 40% soft wood refined to 350 ml Canadian Standard Freeness with a thin stock consistency of 0.5%. About 5 kilos per ton cationic starch is included together with 20% precipitated calcium carbonate. Alum is present in an amount of 2.5 kg/t.

A dosage of 0.325 kg/t of cationic first polymer having IV about 9 dl/g and formed from 79% acrylamide and 21% dimethyl aminoethyl acrylate MeCl quaternary salt is added to the suspension before the fan pump. This resulted in flocculation and degradation of the flocs as the suspension was passed through the fan pump and the centriscreen.

A previously dissolved solution of second anionic polymeric retention aid is added between the centriscreen and the headbox, and the suspension is then drained through the wire and the first pass retention, first pass ash retention and formation are recorded.

In run 1, the second polymer is an unbranched polymer as in example 1 having IV about 16 dl/g and thus is substantially linear and is not in accordance with the invention.

In a second run, the second polymer corresponds with the first polymer except that it is made in the presence of 3.5 ppm methylene bis acrylamide. In this particular run half of this second polymer is a preferred polymer according to the invention made in the absence of chain transfer agent and having IV 9.2 dl/g, and is used as a blend with another second polymer made under the same conditions but with the addition of 200 ppm by weight chain transfer agent, whereby this other polymer has IV 5.5 dl/g.

In run 3, the second material is the same as in example 1 except that it is made in the presence of about 200 ppm methylene bis acrylamide, and thus in not in accordance with the invention.

The results are shown in the following table.

| Run | Branching Agent | Percentage First Pass Retention | Percentage First Pass Ash Retention | Formation |
| --- | --- | --- | --- | --- |
| 1 | 0 ppm | 87.5 | 76.4 | 4.3 |
| 2 | 3.5 ppm | 90.8 | 76.1 | 11.9 |
| 3 | 200 ppm | 78.9 | 50.0 | 13.6 |

The highest quantitative value in each test is desired.

These results show that including a very small amount of the branching agent (Run 2) causes an increase in retention but significantly improves formation, compared to the unbranched polymer (Run 1). Further, they show that significantly cross linking the polymer as in U.S. Pat. No. 5,171,808 (Run 3) worsens retention and only slightly improves formation (at the same dose). These results show that it is therefore possible to operate this process so as to obtain adequate formation and improved retention at constant polymer dosage or equivalent formation and equivalent retention but at reduced polymer dosage.

EXAMPLE 4

First pass rention, first pass ash retention and formation values are determined in laboratory tests conducted on a cellulosic suspension to which 5 kg/t alum is added followed by 0.5 kg/t of the same cationic polymer as in example 2 followed by 0.5 kg/t of the anionic second polymer.

One second polymer is made using 3.5 ppm MBA, without chain transfer agent. Another second polymer is made under the same conditions and from the same monomer charge with 3.5 ppm MBA and 5 ppm sodium hypophosphite as chain transfer agent. Both these are in accordance with the invention.

A third second polymer is a commercial polymer believed to be similar to the first and second except for the fact that it was highly cross linked, probably having been made with above 200 ppm cross linker. The first pass retention and first pass ash retention and formation values are as follows

|  | First Pass Retention | First Pass Ash Retention | Formation |
|---|---|---|---|
| 3.5 ppm MBA | 80.4 | 61.0 | 27.5 |
| 3.5 ppm MBA + 5 ppm chain transfer agent | 80.6 | 61.4 | 29.0 |
| 200 ppm MBA | 73.9 | 43.9 | 33.4 |

These results show that the two processes in accordance with the invention give very much better retention properties than the process using highly cross linked microparticles. The results also show that although the formation values are not as good, the polymer made using a small amount of chain transfer agent gives better formation than the corresponding polymer made in the absence of the chain transfer agent.

What is claimed is:

1. A branched and wholly water soluble anionic polymer which has been made by conventional reverse phase emulsion polymerization of a water soluble ethylenically unsaturated anionic monomer, branching agent and optionally a water soluble, nonionic, ethylenically unsaturated monomer to form an emulsion,
and then substantially dehydrating the emulsion to form a stable dispersion of substantially anhydrous polymer droplets dispersed in oil,
and wherein the polymer has
   (a) intrinsic viscosity above 3 dl/g;
   (b) tan delta rheological oscillation value at 0.005 Hz of above 0.7 or deionised SLV viscosity number which is at least three times the salted SLV viscosity number of the corresponding polymer made in the absence of branching agent;
   (c) a saline Brookfield viscosity of at least 2 mPa.s and
   (d) the branching agent is a polyethylically unsaturated monomer used in an amount of from 1 to 10 ppm molar.

2. A polymer according to claim 1 wherein the tan delta rheological oscillation value at 0.005 Hz is above 0.7.

3. A polymer according to claim 1 which has an intrinsic viscosity above 6 dl/g.

4. A polymer according to claim 1 which has a saline Brookfield viscosity of at least 2.2 mPa.s.

5. A polymer according to claim 1 wherein the branching agent is a polyethylenically unsaturated monomer and the amount of branching agent is about 1 to 10 ppm molar.

6. A polymer according to claim 1 wherein the branching agent is a polyethylenically unsaturated monomer and the amount of branching agent is about 1 to 3.5 ppm molar.

7. A polymer according to claim 1 which has been made in the presence of chain transfer agent.

8. A polymer according to claim 1 which has been made substantially in the absence of chain transfer agent.

9. A polymer according to claim 1 which comprises
   (a) 5 to 97% by weight water soluble, nonionic, ethylenically unsaturated monomer and
   (b) 3 to 95% by weight ethylenically unsaturated anionic monomer.

10. A polymer according to claim 1 which consists essentially of
   (a) 5 to 97% by weight acrylamide
   (b) 3 to 95% by weight monomer selected from the group consisting of acrylic acid, methacrylic acid, crotonic acid, vinyl sulphonic acid, 2-acrylamido-2-methylpropane sulphonic acid or salts thereof and
   (c) 1 to 10 ppm molar of a branching agent which is a polyethylenically unsaturated monomer.

* * * * *